United States Patent
Hartmann-Thompson et al.

(10) Patent No.: US 11,407,898 B2
(45) Date of Patent: Aug. 9, 2022

(54) CURABLE FLUORINATED SILSEQUIOXANE COMPOSITIONS

(71) Applicant: 3M INNOVATIVE PROPERTIES COMPANY, St. Paul, MN (US)

(72) Inventors: Claire Hartmann-Thompson, Lake Elmo, MN (US); Evan L. Schwartz, Vadnais Heights, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/770,973

(22) PCT Filed: Dec. 7, 2018

(86) PCT No.: PCT/IB2018/059777
§ 371 (c)(1),
(2) Date: Jun. 9, 2020

(87) PCT Pub. No.: WO2019/116189
PCT Pub. Date: Jun. 20, 2019

(65) Prior Publication Data
US 2021/0380808 A1   Dec. 9, 2021

Related U.S. Application Data

(60) Provisional application No. 62/598,082, filed on Dec. 13, 2017.

(51) Int. Cl.
| | | |
|---|---|---|
| *C08G 77/20* | (2006.01) | |
| *C08L 83/08* | (2006.01) | |
| *C08G 77/08* | (2006.01) | |
| *C08G 77/16* | (2006.01) | |
| *C08G 77/24* | (2006.01) | |
| *C09D 183/08* | (2006.01) | |

(52) U.S. Cl.
CPC .............. *C08L 83/08* (2013.01); *C08G 77/08* (2013.01); *C08G 77/16* (2013.01); *C08G 77/20* (2013.01); *C08G 77/24* (2013.01); *C09D 183/08* (2013.01); C08G 2150/00 (2013.01); C08L 2203/16 (2013.01); C08L 2205/025 (2013.01); C08L 2312/00 (2013.01)

(58) Field of Classification Search
CPC .... C09D 183/008; C08G 77/24; C08G 77/20; C08G 77/16
See application file for complete search history.

(56) References Cited

U.S. PATENT DOCUMENTS

| | | | |
|---|---|---|---|
| 2014/0178698 A1 | 6/2014 | Rathore | |
| 2015/0299399 A1* | 10/2015 | Rathore | C08G 77/20 428/447 |
| 2016/0096853 A1 | 4/2016 | Warner | |

FOREIGN PATENT DOCUMENTS

| | | |
|---|---|---|
| WO | WO 2006-073785 | 7/2006 |
| WO | WO 2015-088932 | 6/2015 |
| WO | WO 2015-195268 | 12/2015 |

OTHER PUBLICATIONS

"Norland Low Refractive Index Adhesives (Ranging From 1.315 to 1.48) for Bonding Glass and Plastic", Norland Products [retrieved from the internet on Aug. 8, 2020], URL: <https://www.norlandproducts2.com/adhesives/adproductsdetail_header_removed.asp?Prdid=1315> 2020, pp.

Groh, "What Is the Lowest Refractive Index of an Organic Polymer?", Macromolecules, 1991, vol. 24, pp. 6660-6663.

Iacono, "Fluorinated Polyhedral Oligosilsesquioxane Surfaces and Superhydrophobicity", Chapter 6, Applications of Polyhedral Oligomeric Silsesquioxanes, 2011, pp. 229-246.

Kannan, "Fluoro-silsesquioxane-urethane Hybrid for Thin Film Applications", ACS Applied Materials & Interfaces, 2009, vol. 01, No. 02, pp. 336-347.

Pina-Hernandez, "Easy Duplication of Stamps Using UV-cured Fluoro-silsesquioxane for Nanoimprint Lithography", Journal of Vacuum Science & Technology B, 2008, vol. 26, pp. 2426-2429.

International Search Report for PCT International Application No. PCT/IB2018/059777, dated Mar. 11, 2019, 4 pages.

* cited by examiner

*Primary Examiner* — Kuo Liang Peng
(74) *Attorney, Agent, or Firm* — Jeffrey M. Olofson

(57) ABSTRACT

Curable silsesquioxane compositions, include three dimension networks of Formula I, Formula II, or a combination of Formula I and Formula II, where the oxygen atom at the * is bonded to another Si atom, R is a fluorinated organic group, R2 is an ethylenically unsaturated organic group, n+m is greater than 3, and the —OH groups are present in an amount of at least 15 wt-% of the network. The curable composition may also include a silanol-terminated fluorinated polysiloxane fluid. The curable composition is a coatable composition that is solvent free and wets glass. The curable composition, when cured, has a refractive index of 1.40 or lower.

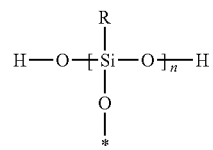

Formula I

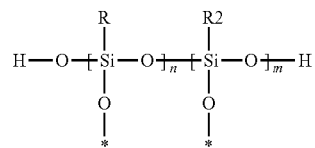

Formula II

22 Claims, No Drawings

CURABLE FLUORINATED SILSEQUIOXANE COMPOSITIONS

FIELD OF THE DISCLOSURE

This disclosure relates to curable compositions that include fluorinated silsesquioxane compounds.

BACKGROUND

Increasingly, optical devices are becoming more complicated and involve more and more functional layers. As light travels through the layers of the optical device, the light can be altered by the layers in a wide variety of ways. For example, light can be reflected, refracted or absorbed. In many cases, layers that are included in optical devices for non-optical reasons adversely affect the optical properties. For example, if a support layer is included that is not optically clear, the absorption of light by the non-optically clear support layer can adversely affect the light transmission of the entire device.

One common difficulty with multi-layer optical devices is that when layers of differing refractive indices are adjacent to each other, refraction of light can occur at their interface. In some devices this refraction of light is desirable, but in other devices the refraction is undesirable. In order to minimize or eliminate this refraction of light at the interface between two layers, efforts have been made to minimize the difference in refractive index between the two layers that form the interface. However, as a wider range of materials are employed within optical devices, the matching of refractive indices can become increasingly difficult. Organic polymer films and coatings, which are frequently used in optical devices, have a limited range of refractive indices. As materials with a wider range of refractive indices are used in optical devices, both high refractive index and low refractive index, it has become increasingly difficult to prepare organic polymeric compositions which have suitable refractive indices and yet retain the desirable features of organic polymers, features such as ease of processing, flexibility, and the like.

Among the curable new classes of materials being investigated as curable compositions for the preparation of polymers are curable silsesquioxane (SSQ) molecules. For example, in US Patent Publication No. 2015/0299399 (Rathore) and PCT Publication Nos. 2015/088932 and 2015/195268 (Rathore et al.) curable silsesquioxane polymers and compositions are described. Fluorinated silsesquioxanes have been described for use in nanoimprint lithography ("Easy duplication of stamps using UV-cured fluoro-silsesquioxane for nanoimprint lighography" *Journal of Vacuum Science &Technology B: Microelectronics and Nanometer Structures Porcessing, Measurement, and Phenomena* 26, 2426-2429 (2008) Carlos Pina-Hernandez, Peng-Fei Fu, and L. Jay Guo) and for preparing superhydrophobic surfaces ("Chapter 6 Fluorinated Polyhedral Oligosilesesquioxane Surfaces and Superhydrophobicity" *Application of Polyhedral Oligomeric Silsesquioxanes*, Advances in Silicon Science 3, C. Harmann-Thompson ed., 229-246, (2011), Scott T. Iaxono, Andrew J. Peloquin, Dennis W. Smith, and Joseph M. Mabry).

SUMMARY

Disclosed herein are curable silsesquioxane compositions, and articles prepared using curable silsesquioxane compositions. In some embodiments, the curable silsesquioxane composition comprises a three-dimensional branched network having the formula of Formula I:

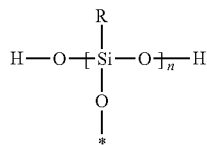

Formula I where the oxygen atom at the * is bonded to another Si atom within the three-dimensional branched network, R is a fluorinated organic group, n is an integer of greater than 3, and the
—OH groups are present in an amount of at least 15 wt-% of the polymer. The curable composition is a coatable composition that is solvent free and wets glass. The curable composition, when cured, has a refractive index of 1.40 or lower.

In other embodiments, the curable silsesquioxane composition comprises a three-dimensional branched network having the formula of Formula II:

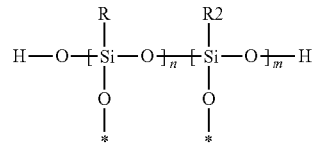

Formula II where the oxygen atom at the * is bonded to another Si atom within the three-dimensional branched network, R is a fluorinated organic group, R2 is an organic group comprising an ethylenically unsaturated group, n+m is an integer of greater than 3, and the —OH groups are present in an amount of at least 15 wt-% of the polymer. The curable composition is a coatable composition that is solvent free and wets glass. The curable composition, when cured, has a refractive index of 1.40 or lower.

In yet other embodiments, the curable silsesquioxane composition comprises a combination of Formula I and Formula II. The curable composition is a coatable composition that is solvent free and wets glass. The curable composition, when cured, has a refractive index of 1.40 or lower.

Any of the above embodiments, may further comprise a silanol-terminated fluorinated polysiloxane fluid. In other words, the curable silsesquioxane composition may comprise Formula I with a silanol-terminated fluorinated polysiloxane fluid, Formula II with a silanol-terminated fluorinated polysiloxane fluid; or a combination of Formula I and Formula II with a silanol-terminated fluorinated polysiloxane fluid.

Also disclosed herein are articles. In some embodiments, the articles comprise a first substrate with a first major surface and a second major surface, and a cured polymeric network contacting at least a portion of second major surface of the first substrate. The cured polymeric network comprises a layer of a cured curable composition comprising a three-dimensional branched network having the formula of Formula I, Formula II, or a combination of Formula I and Formula II. The curable composition may further comprise a silanol-terminated fluorinated polysiloxane fluid. The curable composition is a coatable composition that is solvent free and wets glass. The curable composition, when cured, has a refractive index of 1.40 or lower.

DETAILED DESCRIPTION

The increased complexity of optical devices place increasingly difficult to meet requirements upon the materials used in them. In particular, organic polymeric materials have found widespread use in optical devices, but increasing stringent requirements are being placed upon these polymeric materials.

For example, thin organic polymeric films are desirable for a wide range of uses in optical devices, as adhesives, protective layers, spacer layers, and the like. As articles have become more complex, the physical demands upon these layers have increased. For example, as optical devices have become more compact, and at the same time often include more layers, there has been an increasing need for thinner layers.

Additionally, not only do these layers have to supply their physical role (adhesion, protection, spacing, and the like) they must also provide the requisite optical properties. Among the properties that are becoming increasingly important is refractive index. As light travels through the layers of a multilayer article, it encounters the interface between layers. If the refractive indices of the layers are different, light can be refracted. In many applications it is desirable to minimize the refractive index difference between layers, in other optical applications it is desirable to maximize the refractive index difference between layers. As used herein, the term "low refractive index" refers to materials with a refractive index of 1.40 or less, and the term "high refractive index" refers to materials with a refractive index of 1.60 or greater.

An example of an optical device that utilizes thin film layers are OLED (organic light-emitting diode) devices, light extraction films, and daylight redirecting films. The low refractive index layers present in these devices require not only a low refractive index, but also a variety of other properties such as optical clarity, and coatability and curability to form thin layers. Therefore, organic curable materials that are coatable to form optically clear layers that have a low refractive index are desirable.

Among the organic polymeric materials that have been used to form low refractive index coatings are fluorinated polymers. For example, fluorinated polymers have been used to form antireflection (AR) coatings in optical devices. For example, in PCT Publication No. WO 2006/073785 AR films are described that include a co-crosslinked interpenetrating polymer network of a fluoropolymer phase and an acrylate phase. As described in Groh and Zimmerman, Macromolecules, Vol. 24 p. 6660 (1991), it is known that fluorine containing materials have an inherently low refractive index. Fluoropolymers provide additional advantages over conventional hydrocarbon-based materials such as relatively high chemical inertness (in terms of acid and base resistance), thermal stability, dirt and stain resistance (due to low surface energy) low moisture absorption, and resistance to weather and solar conditions.

However, the low surface energy of the curable fluoropolymer materials tend to make them difficult to coat, since the low surface energy inhibits wet out on a wide variety of surfaces. Additionally, the low surface energy fluoropolymer materials can also adhere poorly to surfaces upon curing for the same reasons. This is a manifestation of the age old conundrum of how to anchor a material to a surface when the material has the property of resisting adhesion to it (e.g., how do you get a non-stick layer to stick to the surface of a frying pan?).

Also, for the same reasons, these curable fluoropolymer materials tend to be immiscible with many other organic polymeric materials. This immiscibility can cause mixtures of the fluoropolymers with organic polymers to form phase separated domains, which is detrimental to optical clarity especially if the domains are larger than the wavelength of visible light. One way around this problem is to use a solvent to prepare a homogeneous solution, polymerize the reactive components in the solvent and then coat them and dry them, or coating the reactive solution and then polymerizing them. In this way, the solvent serves as a homogenizing medium for the otherwise immiscible materials, and also serves as a wetting agent to wet the surface to which the solution is coated.

However, the use of solvents is more and more disfavored. There are many reasons for this. The added cost of solvents and the need for special handling steps for the solvent-borne compositions is one issue. Also, the need for a drying step to remove the solvent is undesirable, and the use of solvents with some substrate surfaces is not possible. Finally, especially with thin films with requirements for precise thickness and smoothness, the use of solvent coatings, which upon drying decrease in thickness and can lose surface smoothness, is not suitable.

Therefore, there is a need for curable low refractive index materials that can be delivered as 100% solids coatings that wet a variety of surfaces. By "100% solids", it is meant that the coating compositions do not contain volatile solvents, and that all of the mass that is deposited on a surface remains there, no volatile mass is lost from the coating.

Therefore, the present disclosure includes curable compositions that comprise fluorinated silsesquioxane compositions. These curable compositions are coatable on a wide variety of substrates, and upon curing form coatings with a low refractive index, that is to say a refractive index of 1.40 or less, and are optically clear. The curable compositions may include a mixture of silsesquioxanes, and may additionally include a co-curable fluorinated siloxane fluid. The curable compositions can be used to prepare cured coating layers that can be incorporated into a wide range of articles.

A silsesquioxane (SSQ) is a siloxane compound with the composition formula $[(RSiO_{1.5})_n]$, where its main chain backbone is composed of Si—O bonds. Its name indicates that it is a siloxane with a unit composition formula containing 1.5 oxygen atoms (1.5=sesqui) [Sil-sesqui-oxane]. As expressed by its composition $[(RSiO_{1.5})_n]$, SSQ can be considered as an interim substance between inorganic silicon $[SiO_2]$ (silica) and organic silicon $[(R_2SiO)_n]$ (a siloxane or silicone). In contrast to the insolubility of a completely inorganic material like silica, the organic groups of the SSQ permits it to dissolve in and from homogeneous blends with a range of organic materials. SSQ can take a number of different types of skeletal structures, including linear (sometimes called ladder) structures, cage structures, and branched structures which can be branched versions of either caged or linear structures.

The curable compositions of this disclosure are caged SSQ with functional groups on the periphery of the cage structures. Among the caged structural types, POSS (polyhedral oligomeric silsesquioxane) are among the most common, and the structure shown above is an example of a POSS.

Silsesquioxanes have traditionally been synthesized by hydrolysis organotrichlorosilanes. An idealized synthesis of POSS is shown in Reaction Scheme A below:

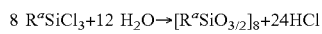

Reaction Scheme A

Depending on the $R^a$ substituent, the exterior of the cage can be further modified. Generally, $R^a$ is a hydrogen atom, an alkyl group an aryl group, or an alkoxy group.

The effect of adding silsesquioxanes to polymer compositions is difficult to predict. One common concern with the use of silsesquioxane additives is the potential of the silsesquioxanes to agglomerate and form microdomains within the polymer blend. These microdomains can not only adversely affect the physical properties of the blend, they can also adversely affect the optical properties of the blend. The effect of adding silsesquioxanes with fluorocarbon groups to polymer compositions is even more unpredictable as these fluorinated SSQ have not been as widely studied as hydrocarbon-containing SSQ compounds.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

As used herein, the term "adjacent" refers to two layers that are proximate to another layer. Layers that are adjacent may be in direct contact with each other, or there may be an intervening layer. There is no empty space between layers that are adjacent.

The curable ink compositions are "substantially solvent free" or "solvent free". As used herein, "substantially solvent free" refers to the curable ink compositions having less than 5 wt-%, 4 wt-%, 3 wt-%, 2 wt-%, 1 wt-% and 0.5 wt-% of non-polymerizable (e.g. organic) solvent. The concentration of solvent can be determined by known methods, such as gas chromatography (as described in ASTM D5403). The term "solvent free" suggests that no solvent is present in the composition. It should be noted that whether the curable ink composition is substantially solvent free or solvent free, no solvent is deliberately added.

Typically the curable ink compositions are described as "100% solids". As used herein, "100% solids" refers to curable ink compositions that do not contain volatile solvents and that all of the mass that is deposited on a surface remains there, no volatile mass is lost from the coating.

The terms "Tg" and "glass transition temperature" are used interchangeably. If measured, Tg values are determined by Differential Scanning Calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is understood by one of skill in the art.

The terms "room temperature" and "ambient temperature" are used interchangeably and have their conventional meaning, that is to say refer to temperature of 20-25° C.

The term "organic" as used herein to refer to a cured layer, means that the layer is prepared from hydrocarbon materials and is free of inorganic materials.

The term "fluorinated" as used herein to refer to substituent groups, refers to groups having at least one hydrogen atom replaced by a fluorine atom. The term "fluorinated organic group" refers to a hydrocarbon group wherein within the group at least one hydrogen atom has been replaced by a fluorine atom. Examples of fluorinated organic groups include, for example, fluorinated alkyl groups of the type: —$(CH_2)_n$—$CF_3$; and —$(CH_2)_n$—$(CF_2)_m$—$CF_3$.

The term "(meth)acrylate" refers to monomeric acrylic or methacrylic esters of alcohols. Acrylate and methacrylate monomers or oligomers are referred to collectively herein as "(meth)acrylates". The term "(meth)acrylate-based" as used herein refers to a polymeric composition that comprises at least one (meth)acrylate monomer and may contain additional (meth)acrylate or non-(meth)acrylate co-polymerizable ethylenically unsaturated monomers. Polymers that are (meth)acrylate based comprise a majority (that is to say greater than 50% by weight) of (meth)acrylate monomers.

The term "(meth)acryloyloxy group" includes an acryloyloxy group (—O—(CO)—CH=$CH_2$) and a methacryloyloxy group (—O—(CO)—C($CH_3$)=$CH_2$).

The term "(meth)acryloylamino group" includes an acryloylamino group (—NR—(CO)—CH=$CH_2$) and a methacryloylamino group (—NR—(CO)—C($CH_3$)=$CH_2$) including embodiments wherein the amide nitrogen is bonded to a hydrogen, methyl group, or ethyl group (R is H, methyl, or ethyl).

The terms "free radically polymerizable" and "ethylenically unsaturated" are used interchangeably and refer to a reactive group which contains a carbon-carbon double bond which is able to be polymerized via a free radical polymerization mechanism.

The term "hydrocarbon group" as used herein refers to any monovalent group that contains primarily or exclusively carbon and hydrogen atoms. Alkyl and aryl groups are examples of hydrocarbon groups.

The term "silsesquioxane" as used herein refer to siloxane compounds of the general formula $(RSiO_{1.5})_n$. The silsesquioxane structure may have a linear (often referred to as a ladder structure), caged or branched configuration.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example,
—CH$_2$CH$_2$(OCH$_2$CH$_2$)$_n$OCH$_2$CH$_2$—.

The term "alkoxy" refers to a monovalent group of formula —OR$^a$ where R$^a$ is an alkyl group.

Unless otherwise indicated, "optically transparent" refers to a layer, film, or article that has a high light transmittance over at least a portion of the visible light spectrum (about 400 to about 700 nm). Typically optically transparent layers, films, or articles have a luminous transmission of at least 90%.

Unless otherwise indicated, "optically clear" refers to an layer, film, or article that has a high light transmittance over at least a portion of the visible light spectrum (about 400 to about 700 nm), and that exhibits low haze. Typically optically clear layers, films, or articles have visible light transmittance values of at least 90%, often at least 95%, and haze values of 5% or less, often 2% or less. Luminous transmission and haze can be measured using techniques such as are described in ASTM D1003-11.

Disclosed herein are a variety of curable silsesquioxane compositions. The curable compositions are described as a first class of curable compositions with include a curable composition containing a three-dimensional branched network of Formula I, a second class of curable composition that includes a three-dimensional branched network of Formula II, and curable compositions that include a mixture of Formula I and Formula II. In addition, other curable materials such as silicone fluids may be included in the curable compositions.

The first class of curable compositions comprise a three-dimensional branched network having the formula of Formula I:

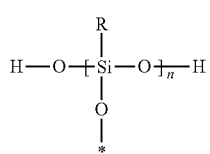

Formula I wherein the oxygen atom at the * is bonded to another Si atom within the three-dimensional branched network; R is a fluorinated organic group; n is an integer of greater than 3; and the —OH groups are present in an amount of at least 15 wt-% of the polymer. The curable composition when cured has a refractive index of 1.40 or lower and is optically clear. In some embodiments, the cured composition has a refractive index that is 1.38 or lower. Additionally, the curable compositions are free from solvents and wet glass. Wetting is a well understood phenomenon in the coating arts and means that a composition flows and covers the surface of the glass substrate to maximize the attractive forces between the glass surface and curable composition. While not wishing to be bound by theory, it is believed that the hydroxyl groups in the curable SSQ composition help to raise the surface energy and permit the composition to wet glass, despite the presence of fluorinated organic groups which lower the surface energy of the SSQ. The phenomenon of wetting of a substrate like glass can be measured in a variety of ways, as is well known by one of skill in the art. It should be noted that the ability to wet glass is a physical property of the curable composition, and that this does not mean the curable composition is coated on glass, nor is the ability to wet glass a process limitation. Much like, for example, the peel adhesion is a listed physical property of a pressure sensitive adhesive, and this property is measured using a model test construction including a substrate/adhesive/backing, it does not mean that a pressure sensitive adhesive with the given peel adhesion value necessary is used in a such a construction or that the articles described as using the pressure sensitive adhesive are such constructions, rather the peel adhesion is a physical property of the adhesive itself.

In some embodiments, the fluorinated organic group R in Formula I comprises a fluorinated alkyl group of —(CH$_2$)$_a$CF$_3$, or a —(CH$_2$)$_b$(CF$_2$)$_c$CF$_3$ group; where a is an integer of 1-6; b is an integer of 1-6; and c is an integer of 1-10. In some particularly suitable embodiments are ones with fluorinated alkyl groups of —(CH$_2$)$_a$CF$_3$, where a is 2, or a —(CH$_2$)$_b$(CF$_2$)$_c$CF$_3$ group where b is 2 and c is 5.

As mentioned above, n is an integer of greater than 3. In some embodiments, n is an integer of at least 10. In certain embodiments, n is an integer of no greater than 100. In certain embodiments, n is an integer of no greater than 25.

In some embodiments, the —OH groups are present in an amount of greater than 15 wt-% of the polymer. As the hydroxyl content increases the wettability of the curable composition to glass can increase. In certain embodiments, the —OH groups are present in an amount of at least 16, 17, 18, 19, or 20 wt-% of the polymer. In some embodiments, the —OH groups are present in an amount of at least 21, 22, 23, 24, or 25 wt-% of the polymer. In some embodiments, the —OH groups are present in an amount of at least 26, 27, 28, 29, or 30 wt-% of the polymer. Typically, the —OH groups are present in an amount of no greater than 60 wt-% of the polymer. In certain embodiments, the —OH groups are present in an amount of no greater than 55 wt-%, or 50 wt-%, or 45 wt-%, or 40 wt-% or 35 wt-% of the polymer. In certain embodiments, the —OH groups are present in an amount of no greater than 30 wt-% of the polymer. The amount of —OH groups present is balanced to provide the desirable combination of curability and wettability.

The compounds of Formula I can be prepared by the hydrolysis with dilute aqueous hydrochloric acid of precursor molecules of the type: RSi(OR$^b$)$_3$ where R is a fluorinated organic group as described above and —OR$^b$ is a hydrolysable alkoxy group with R$^b$ being an alkyl group such as methyl, ethyl, and the like. The synthesis of these compounds is further elucidated in the Examples section below.

In some embodiments, the curable composition further comprises a silanol-terminated fluorinated polysiloxane fluid. Silanol fluids, also sometimes called silicone fluids, are fluids that contain terminal hydroxyl groups and siloxane repeat units of the type —O—SiR$^c$R$^d$—, wherein each R$^c$ and R$^d$ group is independently an alkyl, aryl, or fluorinated alkyl group with the proviso that at least some of the groups R$^c$ and/or R$^d$ are fluorinated alkyl groups.

A wide range of silanol-terminated fluorinated polysiloxane fluids are suitable. A particularly suitable silanol-terminated fluorinated polysiloxane fluid has the general formula of Formula III:

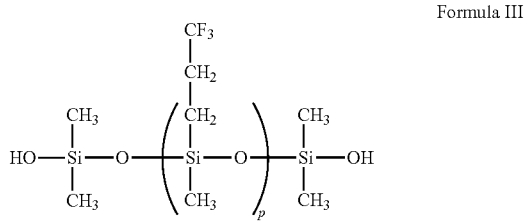

Formula III where p is an integer of 1 or greater, such that the fluid has a viscosity of from 50-250 centistokes.

In some embodiments, it may be desirable to add a condensation cure catalyst. Silanol functional groups (—SiOH) condense with each other to form a siloxane linkage (—Si—O—Si—) and generate an equivalent of water. This condensation reaction can be accelerated through the use of one or more condensation catalysts. Examples of suitable catalysts include amines, such as aminopropylsilane derivatives, and carboxylic acid salts of lead, tin, and zinc. Tin (II) octoates, hexanoates, laureates, and oleates, as well as the salts of dibutyl tin, are particularly useful. Besides catalytic activity, it is desirable that the catalyst be soluble in the curable composition.

In some embodiments, the curable composition, with or without the silanol-terminated fluorinated polysiloxane fluid, may further comprise a three-dimensional branched network having the formula of Formula II:

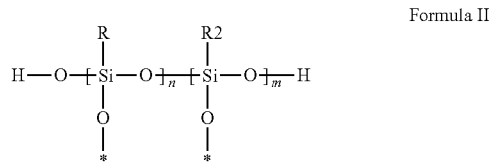

Formula II where the oxygen atom at the * is bonded to another Si atom within the three-dimensional branched network; R is a fluorinated organic group; R2 is an organic group comprising an ethylenically unsaturated group; n+m is an integer of greater than 3; and the —OH groups are present in an amount of at least 15 wt-% of the polymer.

In some embodiments of Formula II, R comprises a fluorinated alkyl group as in Formula I above, especially a fluorinated alkyl of —$(CH_2)_a CF_3$, or a —$(CH_2)_b(CF_2)_c CF_3$ group; where a is an integer of 1-6; b is an integer of 1-6; and c is an integer of 1-10. In some particularly suitable embodiments include ones with fluorinated alkyl groups of —$(CH_2)_a CF_3$, where a is 2, or a —$(CH_2)_b(CF_2)_c CF_3$ group where b is 2 and c is 5.

In some embodiments of Formula II, R2 has the formula —Y—Z, wherein Y is a bond, an alkylene group, an arylene group, or a combination thereof, and Z is an ethylenically unsaturated group selected from a vinyl group, a vinylether group, a (meth)acryloyloxy group, and a (meth)acryloylamino group. In some particular embodiments, where Y is a bond, a (C1-C20)alkylene group, a (C6-C12)arylene group, a (C1-C20)alk(C6-C12)arylene group, a (C6-C12)ar(C1-C20)alkylene group, or a combination thereof.

The addition of a compound of Formula II to the curable composition adds an additional curing mechanism to the curable composition, namely free radical polymerization. Therefore, typically when compounds of Formula II are present, a free radical initiator is added to the curable composition.

A wide range of free radical initiators are suitable for use in the curable compositions. In many embodiments the free radical initiator is a photoinitiator, meaning that upon absorption of light of the appropriate wavelength (typically UV light) the photoinitiator generates free radicals. Suitable photoinitiators include benzophenone, 4-methylbenzophenone, benzoyl benzoate, phenylacetophenones, 2,2-dimethoxy-2-phenylacetophenone, alpha,alpha-diethoxyacetophenone, 1-hydroxy-cyclohexyl-phenyl-ketone (available under the trade designation IRGACURE 184 from BASF Corp., Florham Park, N.J.), 2-hydroxy-2-methyl-1-phenyl-propan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one (available under the trade designation DAROCURE 1173 from BASF Corp.), 2,4,6-trimethylbenzoyl-diphenylphosphine oxide, and combinations thereof (e.g., a 50:50 by wt. mixture of 2,4,6-trimethylbenzoyl-diphenylphosphine oxide and 2-hydroxy-2-methyl-1-phenylpropan-1-one, available under the trade designation DAROCURE 4265 from BASF Corp.).

The initiator is typically present in the curing composition in an amount of at least 0.01 percent by weight (wt-%), based on the total weight of curable material in the curable composition. The initiator is typically present in a coating composition in an amount of no greater than 5 wt-%, based on the total weight of curable material in the coating composition.

Also disclosed herein are a second class of curable compositions that comprise a three-dimensional branched network having the formula of Formula II without the three-dimensional branched network of Formula I:

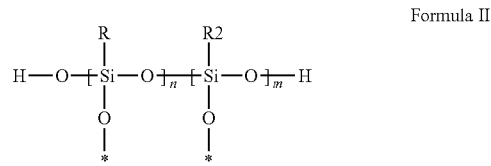

Formula II where the oxygen atom at the * is bonded to another Si atom within the three-dimensional branched network; R is a fluorinated organic group; R2 is an organic group comprising an ethylenically unsaturated group; n+m is an integer of greater than 3; and the —OH groups are present in an amount of at least 15 wt-% of the polymer.

In some embodiments, the sum of n+m is an integer of at least 10. In certain embodiments, n+m is an integer of no greater than 100. In certain embodiments, n+m is an integer of no greater than 25. In some embodiments, n and m are selected such the copolymer comprises at least 25, 26, 27, 28, 29, or 30 mol % of repeat units comprising ethylenically unsaturated group(s) R2. In some embodiment, n and m are selected such the copolymer comprises no greater than 85, 80, 75, 70, 65, or 60 mol % of repeat units comprising ethylenically unsaturated group(s) R2.

In some embodiments of Formula II, R comprises a fluorinated alkyl group as in Formula I above, especially a fluorinated alkyl of —$(CH_2)_a CF_3$, or a —$(CH_2)_b(CF_2)_c CF_3$ group; where a is an integer of 1-6; b is an integer of 1-6; and c is an integer of 1-10. In some particularly suitable embodiments include ones with fluorinated alkyl groups of —(CH$_2$)$_a$CF$_3$, where a is 2, or a —(CH$_2$)$_b$(CF$_2$)$_c$CF$_3$ group where b is 2 and c is 5.

In some embodiments of Formula II, R2 has the formula —Y—Z, wherein Y is a bond, an alkylene group, an arylene group, or a combination thereof, and Z is an ethylenically unsaturated group selected from a vinyl group, a vinylether group, a (meth)acryloyloxy group, and a (meth)acryloylamino group. In some particular embodiments, where Y is a bond, a (C1-C20)alkylene group, a (C6-C12)arylene group, a (C1-C20)alk(C6-C12)arylene group, a (C6-C12)ar(C1-C20)alkylene group, or a combination thereof.

This second class of curable compositions have the same desirable properties as those of the first class of curable compositions described above, namely they are coatable compositions that are able to wet glass, and coatings of the curable composition cure to form an optically clear layer with a refractive index of 1.40 or lower. In some embodiments, the refractive index of the cured layer is 1.38 or lower.

As with the first class of curable compositions, the second class of curable compositions may further comprise a silanol-terminated fluorinated polysiloxane fluid. The silanol-terminated fluorinated polysiloxane fluid has the general formula of Formula III:

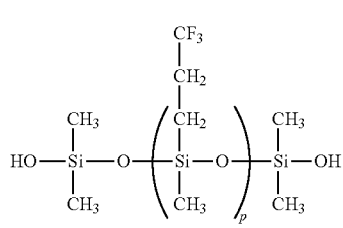

Formula III where p is an integer of 1 or greater, such that the fluid has a viscosity of from 50-250 centistokes. Other related silanol-terminated fluorinated polysiloxane fluids similar to that of Formula III in which the —CH$_2$—CH$_2$—CF$_3$ group is a fluorocarbon group would also be suitable.

The curable compositions may further comprise a condensation cure catalyst, a free radical initiator or both. Suitable condensation cure catalysts and free radical initiators have been discussed above.

Also disclosed herein are articles that include a layer of the curable compositions described above where the curable compositions have been cured to form a cured layer. In some embodiments the articles comprise a first substrate with a first major surface and a second major surface, and a cured polymeric network contacting at least a portion of second major surface of the first substrate, the cured polymeric network comprising a layer of a cured curable composition as described above.

The curable composition comprises a three-dimensional branched network having Formula I, Formula II, or a combination thereof:

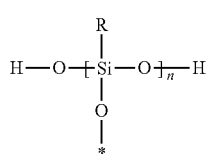

Formula I

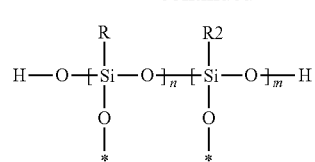

Formula II where the oxygen atom at the * is bonded to another Si atom within the three-dimensional branched network; R is a fluorinated organic group; R2 is an organic groups comprising an ethylenically unsaturated group; n+m is an integer of greater than 3; and the —OH groups are present in an amount of at least 15 wt-% of the polymer, wherein the curable composition when cured has a refractive index of 1.40 or lower.

The curable composition is cured by condensation curing, by free radical polymerization, or by a combination thereof, and therefore may include a condensation cure catalyst, a free radical initiator or a combination thereof as described above.

As was described above, the curable composition may further comprise a silanol-terminated fluorinated polysiloxane fluid. In some embodiments, the silanol-terminated fluorinated polysiloxane fluid has the general formula of Formula III:

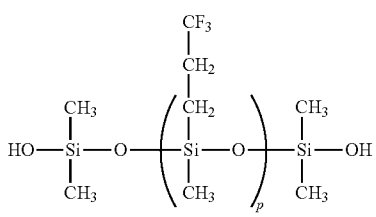

Formula III where p is an integer of 1 or greater, such that the fluid has a viscosity of from 50-250 centistokes.

A wide variety of substrates are suitable for use as the first substrate. The first substrate may be flexible, rigid, or semi-rigid. The substrate may be inorganic such as glass or ceramic or organic. The organic substrates may be rigid, such as polymeric plates of poly methylmethacrylate (PMMA) or polycarbonate (PC), or flexible polymeric films. In some embodiments the first substrate comprises a surface of an electronic device. The device substrate is typically flexible and visible light-transmissive. Suitable substrate materials include organic polymeric materials such as polyethylene terephthalate (PET), polyacrylates, polycarbonate, silicone, epoxy resins, silicone-functionalized epoxy resins, polyester such as MYLAR (made by E. I. du Pont de Nemours & Co.), polyimide such as KAPTON H or KAPTON E (made by du Pont), APICAL AV (made by Kanegafugi Chemical Industry Company), UPILEX (made by UBE Industries, Ltd.), polyethersulfones (PES, made by Sumitomo), polyetherimide, polyethylenenaphthalene (PEN), polymethyl methacrylate, styrene/acrylonitrile, styrene/maleic anhydride, polyoxymethylene, polyvinylnaphthalene, polyetheretherketon, polyaryletherketone, high Tg fluoropolymers or fluorinated copolymers (for example, DYNEON HTE terpolymer of hexafluoropropylene, tetrafluoroethylene, and ethylene), poly α-methyl styrene, polyarylate, polysulfone, polyphenylene oxide, polyamideimide, polyimide, polyphthalamide, polyethylene, and polypropylene.

Colorless polyimide, cyclic olefin copolymer and cyclic olefin copolymer can also be utilized. Frequently the substrate comprises PET.

In some embodiments, the article further comprises a second substrate, the second substrate having a first major surface and a second major surface, wherein the cured polymeric network is contacting at least a portion of first major surface of the second substrate. Substrates listed above as suitable for the first substrate are also suitable for use as the second substrate. The second substrate may be same as the first substrate or it may be different.

A wide variety of coating methods can be used to apply the curable compositions of the present disclosure to the surface of a substrate, such as brushing, spraying, dipping, rolling, spreading, and the like. Other coating methods can also be used such as knife coating, gravure coating, die coating, and extrusion coating, for example.

A curable coating composition of the present disclosure can be applied in a continuous or patterned layer. Such layer can be disposed on at least a portion of at least one surface of the substrate. Curing of a curable composition of the present disclosure typically occurs using UV radiation, if free radically polymerizable groups are included in the curable composition mixture.

The following is a list of illustrative embodiments of the present disclosure:

Among the embodiments are curable silsesquioxane compositions. Embodiment 1 includes a curable silsesquioxane composition comprising a three-dimensional branched network having the formula of Formula I:

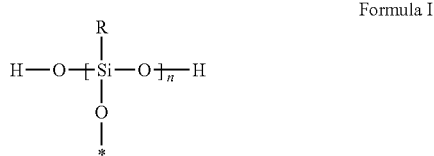

Formula I wherein: the oxygen atom at the * is bonded to another Si atom within the three-dimensional branched network; R is a fluorinated organic group; n is an integer of greater than 3; and the
—OH groups are present in an amount of at least 15 wt-% of the polymer, wherein the curable composition when cured has a refractive index of 1.40 or lower, and wherein the curable composition is a coatable composition that is solvent free and wets glass.

Embodiment 2 is the curable composition of embodiment 1, wherein the curable composition further comprises a silanol-terminated fluorinated polysiloxane fluid.

Embodiment 3 is the curable composition of embodiment 2, wherein the silanol-terminated fluorinated polysiloxane fluid has the general formula of Formula III:

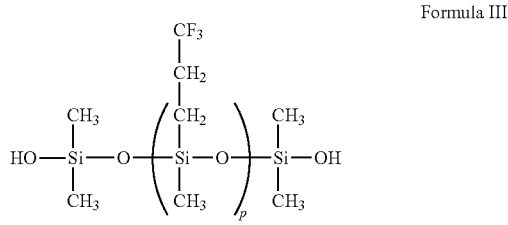

Formula III wherein: p is an integer of 1 or greater, such that the fluid has a viscosity of from 50-250 centistokes.

Embodiment 4 is the curable composition of any of embodiments 1-3, wherein R comprises a $-(CH_2)_aCF_3$, or a $-(CH_2)_b(CF_2)_cCF_3$ group; wherein a is an integer of 1-6; b is an inter of 1-6; and c is an integer of 1-10.

Embodiment 5 is the curable composition of any of embodiments 1-4, wherein the curable composition further comprises a condensation cure catalyst.

Embodiment 6 is the curable composition of any of embodiments 1-5, further comprising a three-dimensional branched network having the formula of Formula II:

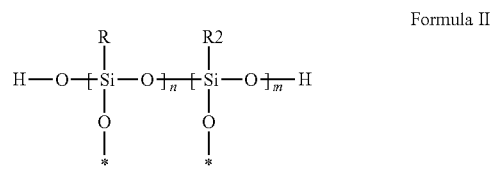

Formula II wherein: the oxygen atom at the * is bonded to another Si atom within the three-dimensional branched network; R is a fluorinated organic group; R2 is an organic group comprising an ethylenically unsaturated group; n+m is an integer of greater than 3; and the —OH groups are present in an amount of at least 15 wt-% of the polymer.

Embodiment 7 is the curable composition of embodiment 6, further comprising at least one free radical initiator.

Embodiment 8 is the curable composition of embodiment 7, wherein the at least one free radical initiator comprises a photoinitiator.

Embodiment 9 is a curable silsesquioxane composition comprising a three-dimensional branched network having the formula of Formula II:

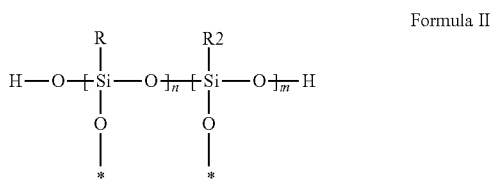

Formula II wherein: the oxygen atom at the * is bonded to another Si atom within the three-dimensional branched network; R is a fluorinated organic group; R2 is an organic group comprising an ethylenically unsaturated group; n+m is an integer of greater than 3; and the —OH groups are present in an amount of at least 15 wt-% of the polymer, wherein the curable composition when cured has a refractive index of 1.40 or lower, and wherein the curable composition is a coatable composition that is solvent free and wets glass.

Embodiment 10 is the curable composition of embodiment 9, wherein the curable composition further comprises a silanol-terminated fluorinated polysiloxane fluid.

Embodiment 11 is the curable composition of embodiment 10, wherein the silanol-terminated fluorinated polysiloxane fluid has the general formula of Formula III:

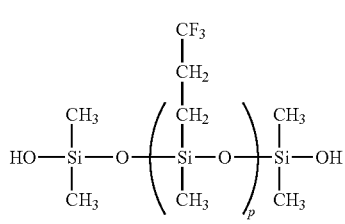

Formula III wherein: p is an integer of 1 or greater, such that the fluid has a viscosity of from 50-250 centistokes.

Embodiment 12 is the curable composition of any of embodiments 9-11, wherein R comprises a —$(CH_2)_aCF_3$, or a —$(CH_2)_b(CF_2)_cCF_3$ group; wherein a is an integer of 1-6; b is an integer of 1-6; and c is an integer of 1-10.

Embodiment 13 is the curable composition of any of embodiments 9-12, wherein R2 has the formula —Y—Z, wherein Y is a bond, an alkylene group, an arylene group, or a combination thereof, and Z is an ethylenically unsaturated group selected from a vinyl group, a vinylether group, a (meth)acryloyloxy group, and a (meth)acryloylamino group.

Embodiment 14 is the curable composition of embodiment 13, wherein Y is a bond, a (C1-C20)alkylene group, a (C6-C12)arylene group, a (C1-C20)alk(C6-C12)arylene group, a (C6-C12)ar(C1-C20)alkylene group, or a combination thereof.

Embodiment 15 is the curable composition of any of embodiments 9-14, wherein the curable composition further comprises a condensation cure catalyst, a free radical initiator or both.

Also disclosed herein are embodiments of articles. Embodiment 16 includes an article comprising: a first substrate with a first major surface and a second major surface; and a cured polymeric network contacting at least a portion of second major surface of the first substrate, the cured polymeric network comprising a layer of a cured curable composition comprising: a three-dimensional branched network having the formula of Formula I:

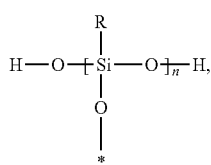

Formula I wherein: the oxygen atom at the * is bonded to another Si atom within the three-dimensional branched network; R is a fluorinated organic group; n is an integer of greater than 3; and the
—OH groups are present in an amount of at least 15 wt-% of the polymer, wherein the curable composition when cured has a refractive index of 1.40 or lower, and wherein the curable composition is a coatable composition that is solvent free and wets glass.

Embodiment 17 is the article of embodiment 16, wherein the curable composition further comprises a silanol-terminated fluorinated polysiloxane fluid.

Embodiment 18 is the article of embodiment 17, wherein the silanol-terminated fluorinated polysiloxane fluid has the general formula of Formula III:

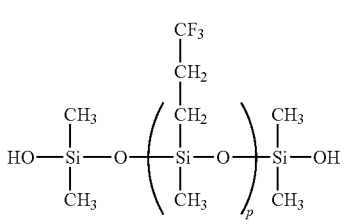

Formula III wherein: p is an integer of 1 or greater, such that the fluid has a viscosity of from 50-250 centistokes.

Embodiment 19 is the article of any of embodiments 16-18, wherein R comprises a —$(CH_2)_aCF_3$, or a —$(CH_2)_b(CF_2)_cCF_3$ group; wherein a is an integer of 1-6; b is an inter of 1-6; and c is an integer of 1-10.

Embodiment 20 is the article of any of embodiments 16-19, wherein the curable composition further comprises a condensation cure catalyst.

Embodiment 21 is the article of any of embodiments 16-20, further comprising a three-dimensional branched network having the formula of Formula II:

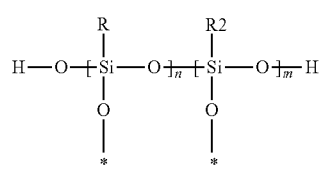

Formula II wherein: the oxygen atom at the * is bonded to another Si atom within the three-dimensional branched network; R is a fluorinated organic group; R2 is an organic group comprising an ethylenically unsaturated group; n+m is an integer of greater than 3; and the —OH groups are present in an amount of at least 15 wt-% of the polymer.

Embodiment 22 is the article of embodiment 21, further comprising at least one free radical initiator.

Embodiment 23 is the article of embodiment 22, wherein the at least one free radical initiator comprises a photoinitiator.

Embodiment 24 is an article comprising: a first substrate with a first major surface and a second major surface; and a cured polymeric network contacting at least a portion of second major surface of the first substrate, the cured polymeric network comprising a layer of a cured curable composition comprising: a three-dimensional branched network having the formula of Formula II:

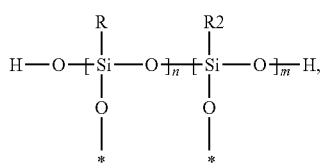

Formula II wherein: the oxygen atom at the * is bonded to another Si atom within the three-dimensional branched network; R is a fluorinated organic group; R2 is an organic group comprising an ethylenically unsaturated group; n+m is an integer of greater than 3; and the —OH groups are present in an amount of at least 15 wt-% of the polymer, wherein the curable composition when cured has a refractive index of 1.40 or lower, and wherein the curable composition is a coatable composition that is solvent free and wets glass.

Embodiment 25 is the article of embodiment 24, wherein the curable composition further comprises a silanol-terminated fluorinated polysiloxane fluid.

Embodiment 26 is the article of embodiment 25, wherein the silanol-terminated fluorinated polysiloxane fluid has the general formula of Formula III:

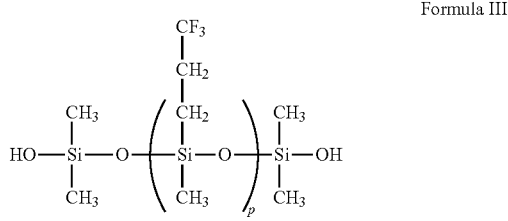

Formula III wherein: p is an integer of 1 or greater, such that the fluid has a viscosity of from 50-250 centistokes.

Embodiment 27 is the article of any of embodiments 24-26, wherein R comprises a —$(CH_2)_aCF_3$, or a —$(CH_2)_b(CF_2)_cCF_3$ group; wherein a is an integer of 1-6; b is an integer of 1-6; and c is an integer of 1-10.

Embodiment 28 is article of any of embodiments 24-27, wherein R2 has the formula
—Y—Z, wherein Y is a bond, an alkylene group, an arylene group, or a combination thereof, and Z is an ethylenically unsaturated group selected from a vinyl group, a vinylether group, a (meth)acryloyloxy group, and a (meth)acryloylamino group.

Embodiment 29 is the article of embodiment 28, wherein Y is a bond, a (C1-C20)alkylene group, a (C6-C12)arylene group, a (C1-C20)alk(C6-C12)arylene group, a (C6-C12)ar(C1-C20)alkylene group, or a combination thereof.

Embodiment 30 is the article of any of embodiments 24-29, wherein the curable composition further comprises a condensation cure catalyst, a free radical initiator or both.

Embodiment 31 is the article of any of embodiments 16-30, wherein the layer of a cured curable composition is cured by condensation curing, by free radical polymerization, or by a combination thereof.

Embodiment 32 is the article of any of embodiments 16-31, further comprising a second substrate, the second substrate having a first major surface and a second major surface, wherein the cured polymeric network is contacting at least a portion of first major surface of the second substrate.

Embodiment 33 is the article of embodiment 32, wherein the first substrate and the second substrate comprises a film, glass or a ceramic.

EXAMPLES

Fluorinated low index silsesquioxane compositions were prepared. The materials were prepared for testing and the physical, optical and mechanical properties were evaluated as shown in the following examples. These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, St. Louis, Mo. unless otherwise noted. The following abbreviations are used herein: g=grams; mol=moles; mm=millimeters; m=meters; min=minutes; hrs=hours; mL=milliliters; K=1,000 (ie 15K=15,000 Daltons molecular weight); Hz=Hertz; cps=centipoise; Dk=dielectric constant; Mn=number average molecular weight; Mw=molecular weight. The terms wt %, and % by weight are used interchangeably.

TABLE 1

| Materials Description |
|---|
| 3,3,3-Trifluoropropyl trimethoxysilane, available as "SIT8372.0" from Gelest, Inc., Morrisville, PA |
| Tridecafluoro 1,1,2,2 tetrahydroctyltrimethoxysilane, available as "SIT8176.0" from Gelest, Inc., Morrisville, PA |
| Heptadecafluoro-1,1,2,2-tetrahydrodecyl)trimethoxysilane, available as "SIH5841.5" from Gelest, Inc., Morrisville, PA |
| Hexamethyldisiloxane, available as "SIH6115.0" from Gelest, Inc., Morrisville, PA |
| Methacryloxypropyltrimethoxysilane, available as "SIM6487.4" from Gelest, Inc., Morrisville, PA |
| 3-Acryloxypropyltrimethoxysilane, available as "SIA0182.0" from Gelest, Inc., Morrisville, PA |
| Silanol-terminated polytrifluoropropylmethylsiloxane (PTFMS 1), available as "FMS9921" from Gelest, Inc., Morrisville, PA |
| Silanol-terminated polytrifluoropropylmethylsiloxane (PTFMS 2), available as "FMS9922" from Gelest, Inc., Morrisville, PA |
| 2,4,6-Trimethylbenzoylphenylphosphinic acid ethyl ester, available as "TPO-L" from BASF, Florham Park, NJ |

Test Methods
Nuclear Magnetic Resonance (NMR)

NMR samples were analyzed as solutions in deuterated tetrahydrofuran (THF). One dimensional (1D) proton $^1$H data were collected for the submitted samples using a Bruker (Billerica, Mass.) "AVANCEA" 600 MHz NMR spectrometer equipped with a cryogenically cooled probe head. Homo- and hetero-nuclear, two dimensional (2D) $^1$H-$^{29}$Si NMR data were also collected to confirm the spectral assignments. One of the residual proto-solvent resonances was used as a secondary chemical shift reference in the proton dimension (δ=1.73). All of the NMR data were collected with the sample held at 25° C.

Gel Permeation Chromatography (GPC)

Samples were prepared singly and injected in duplicate. Solutions of known concentration (target 10 mg/mL) were prepared in tetrahydrofuran (THF, stabilized with 250 ppm BHT) or in toluene, in glass scintillation vials. The vials were swirled for at least 14 hours in order to allow dissolution. The solutions were filtered through 0.45µ PTFE syringe filters and analyzed by GPC. An Agilent (Santa Clara, Calif.) 1260 LC instrument was used with an Agilent "PLgel MIXED-E", 300×7.5 mm I.D column at 40° C., and a NIST polystyrene standard (SRM 705a). A Wyatt Technology Corporation (Goleta, Calif.) "DAWN HELEOS-II" 18 angle Light Scattering detector and a Wyatt Technology Corporation Optilab T-rEX Differential Refractive Index (DRI) detector were used. ASTRA 6 from Wyatt Technology Corporation was used for data collection and analysis.

Thermal Gravimetric Analysis (TGA)

TGA samples were analyzed using the TA Instruments (Wood Dale, Ill.) Discovery Thermogravimetric Analyzer (TGA). The sample was subjected to a heating profile ranging from room temperature (~25° C.) to 700° C. in a nitrogen atmosphere, with a linear heating rate of 20.0° C./min and a Hi-Res resolution setting of 4.0.

Dynamic Scanning Calorimetry (DSC)

DSC samples were prepared for thermal analysis by weighing and loading the material into TA Instruments aluminum DSC sample pans. The specimens were analyzed using the TA Instruments Discovery Differential Scanning Calorimeter (DSC-SN DSC1-0091) utilizing a heat-cool-heat method in standard mode (−155 to ~50° C. at 10° C./min.). After data collection, the thermal transitions were analyzed using the TA Universal Analysis program. The glass transition temperatures were evaluated using the step change in the standard heat flow (HF) curves. The midpoint (half height) temperature of the second heat transition is quoted.

Refractive Index Measurements

Refractive index of silsesquioxane liquids was measured using a Bausch and Lomb (Rochester, N.Y.) refractometer (white light) at room temperature, following the operations manual. Results are shown in Table 4.

Viscosity Measurements 17 mL of liquid sample was loaded into a 25 mm diameter double gap coaxial concentric cylinder apparatus (DIN 53019) on a viscometer, "BOHLIN VISCO 88", Malvern Instruments Ltd (Malvern, UK). A thermal jacket with the double gap cell allowed for the flow of recirculating water heated to 25° C., and the system was allowed to equilibrate for 1 hour prior to taking a measurement. The shear rate was ramped from 100 to 1000 hz, at 100 hz intervals, and the measurement was repeated three times. An average across all data points was taken as the viscosity, in centipoise, for all measurements. Results are shown in Table 5.

Contact Angle Measurements

Static water contact angles were measured at room temperature using a Kruss GmbH (Hamburg, Germany) DSA100 contact angle instrument (5 microliter drop delivered at 195 microliter per minute) on formulations that had been coated and cured onto glass slides. Mean values of five replicates are given (standard deviations in the range 0.5 to 5 degrees). Results are shown in Table 6.

Dielectric Constant Measurements

Dielectric test samples were prepared as follows. The formulations were injected with a syringe in between two glass slides that were coated with easy release liner RF02N (SKC Haas, Korea; 2 mil; 51 micrometers). A Teflon or silicone gasket was used to set a 400 micron gap with a circular cut out of approximately 4" (10.16 cm) diameter. The sample was cured with a Clearstone Technologies (Hopkins, Minn.) CF200 UV-LED (λ=365-400 nm) for 5 minutes per side, for a total of 10 minutes of UV curing at 100% power. The sample discs were carefully removed from the cell and submitted for dielectric constant testing. Dielectric property and electrical conductivity measurements on the discs were performed with an Alpha-A High Temperature Broadband Dielectric Spectrometer modular measurement system from Novocontrol Technologies GmbH (Montabaur, Germany). All testing was performed in accordance with the ASTM D150 test standard. Results are shown in Table 7.

Example Preparation

Example 1 (E1)

3,3,3-Trifluoropropyl trimethoxysilane (29.03 g, 0.133 mol, refractive index 1.355) was added to a mixture containing MEK (2.4 g), deionized water (10.9 g), and dilute hydrochloric acid (0.2 g, 12.3% HCl in water). The resulting clear solution was stirred for 7 days at room temperature. The solution was then washed with dilute aqueous sodium bicarbonate (1×15 mL) followed by deionized water (2×15 mL). Two distinct layers formed, and the upper aqueous layer was removed at each step. Any remaining solvent was evaporated from the remaining lower organosiloxane layer under vacuum, and the product was obtained as a clear colorless liquid. The product was dried over molecular sieves (Aldrich 208604 4A beads, 8-12 mesh) and characterized by NMR, GPC, TGA and DSC (see Test Methods listed above). $^{29}$Si NMR ($d_8$-THF, δ): −68 ($O_3Si(CH_2)_2CF_3$). GPC (THF, DRI): Mn=594, Mw=635, polydispersity=1.07. TGA (20° C. min$^{-1}$, $N_2$): 5% mass loss at 256° C. DSC (10° C. min-1, $N_2$): −20° C. ($T_g$).

Example 2 (E2)

Tridecafluoro 1,1,2,2 tetrahydroctyltrimethoxysilane (62.28 g, 0.133 mol, refractive index 1.332) was added to a mixture containing MEK (2.4 g), deionized water (10.9 g), and diluted hydrochloric acid (0.2 g, 12.3% HCl in water). The resulting clear solution was stirred for 7 days at room temperature. The solution was then washed with dilute aqueous sodium bicarbonate (1×15 mL) followed by deionized water (2×15 mL). Two distinct layers formed, and the upper aqueous layer was removed at each step. Any remaining solvent was evaporated from the remaining lower organosiloxane layer under vacuum, and the product was obtained as a clear colorless liquid. The product was dried over molecular sieves (Aldrich 208604 4A beads, 8-12 mesh), and was characterized by NMR, TGA and DSC (see Test Methods listed above). $^1$H NMR (HFE-7100 fluorochemical solvent $C_4F_9OCH_3$/1 drop $d_6$-acetone, δ): −58, −68 ($O_3Si(CH_2)_2(CF_2)_5CF_3$). TGA (20° C. min$^{-1}$, $N_2$): 5% mass loss at 257° C. DSC (10° C. min-1, $N_2$): −44° C. ($T_g$).

Example 3 (E3)

Deionized water (14.4 g), MEK (3.1 g) and dilute hydrochloric acid (0.3 g, 12.3%, $H_2O$) were combined in a flask. 3,3,3-trifluoropropyltrimethoxysilane (19.1 g, 0.088 mol), methacryloxypropyltrimethoxysilane (21.7 g, 0.088 mol), and hexamethyldisiloxane (8.1 g, 0.050 mol) were combined, then stirred into the solvent mixture. The mixture was stirred at room temperature for 40 minutes, then 10 mL of MEK was added. The mixture was stirred for a further 45 minutes, and was then washed with dilute aqueous sodium bicarbonate (1×15 mL) followed by deionized water (2×15 mL). Two distinct layers formed, and the upper aqueous layer was removed at each step. Any remaining solvent was evaporated from the remaining lower organosiloxane layer under vacuum, and the product was obtained as a clear colorless liquid. The product was dried over molecular sieves (Aldrich 208604 4A beads, 8-12 mesh), and was characterized by NMR, GPC, TGA and DSC (see Test Methods listed above). $^{29}$Si NMR ($d_8$-THF): δ=11 ($Si(CH_3)_3$O), −58, −66, −69 (R'Si(OR)$O_2$), −48.0 ($H_3CSi(OH)_2$O). GPC (Toluene, LS): $M_n$=2200, $M_w$=3050, polydispersity=1.39. TGA (20° C. min$^{-1}$, $N_2$): 5% mass loss at 171° C. DSC (10° C. min-1, $N_2$): −67° C. ($T_g$).

Examples 4-18 (E4-E18)

Examples 4 to 18 were prepared using the method described for E3 (above) using the monomers and monomer ratios given in Table 2. Example 19 (E19) was prepared using 3,3,3-trifluoropropyltrimethoxysilane (80 mol %) and methacryloxypropyltrimethoxysilane (20 mol %) in the method described for silsesquioxane 3 (above) except that 15 g, (0.094 mol) hexamethyldisiloxane was used. All products were transparent colorless liquids. NMR showed that the fluoro/(meth)acrylate molar ratios in the final silsesquioxane products matched the molar ratios of fluorosilane/(meth)acrylatesilane in the starting monomer mixtures.

TABLE 2

(Meth)acrylate silane monomers and fluoro silane monomers, and their molar ratios

| Example | Monomers, and monomer molar ratios |
|---|---|
| E3 | 3,3,3-trifluoropropyltrimethoxysilane (50 mol %)<br>Methacryloxypropyltrimethoxysilane (50 mol %) |
| E4 | 3,3,3-trifluoropropyltrimethoxysilane (70 mol %)<br>Methacryloxypropyltrimethoxysilane (30 mol %) |
| E5 | 3,3,3-trifluoropropyltrimethoxysilane (80 mol %)<br>Methacryloxypropyltrimethoxysilane (20 mol %) |
| E6 | 3,3,3-trifluoropropyltrimethoxysilane (90 mol %)<br>Methacryloxypropyltrimethoxysilane (10 mol %) |
| E7 | 3,3,3-trifluoropropyltrimethoxysilane (95 mol %)<br>Methacryloxypropyltrimethoxysilane (5 mol %) |
| E8 | Tridecafluoro 1,1,2,2 tetrahydroctyltrimethoxysilane (70 mol %)<br>Methacryloxypropyltrimethoxysilane (30 mol %) |
| E9 | Tridecafluoro 1,1,2,2 tetrahydroctyltrimethoxysilane (80 mol %)<br>Methacryloxypropyltrimethoxysilane (20 mol %) |
| E10 | Tridecafluoro 1,1,2,2 tetrahydroctyltrimethoxysilane (90 mol %)<br>Methacryloxypropyltrimethoxysilane (10 mol %) |
| E11 | Tridecafluoro 1,1,2,2 tetrahydroctyltrimethoxysilane (95 mol %)<br>Methacryloxypropyltrimethoxysilane (5 mol %) |
| E12 | Heptadecafluoro-1,1,2,2-tetrahydrodecyl)trimethoxysilane (70 mol %)<br>Methacryloxypropyltrimethoxysilane (30 mol %) |
| E13 | Heptadecafluoro-1,1,2,2-tetrahydrodecyl)trimethoxysilane (80 mol %)<br>Methacryloxypropyltrimethoxysilane (20 mol %) |
| E14 | Heptadecafluoro-1,1,2,2-tetrahydrodecyl)trimethoxysilane (90 mol %)<br>Methacryloxypropyltrimethoxysilane (10 mol %) |
| E15 | Heptadecafluoro-1,1,2,2-tetrahydrodecyl)trimethoxysilane (95 mol %)<br>Methacryloxypropyltrimethoxysilane (5 mol %) |
| E16 | Tridecafluoro 1,1,2,2 tetrahydroctyltrimeth oxysilane (80 mol %)<br>Acryloxypropyltrimethoxysilane (20 mol %) |
| E17 | Tridecafluoro 1,1,2,2 tetrahydroctyltrimeth oxysilane (90 mol %)<br>Acryloxypropyltrimethoxysilane (10 mol %) |
| E18 | Tridecafluoro 1,1,2,2 tetrahydroctyltrimeth oxysilane (95 mol %)<br>Acryloxypropyltrimethoxysilane (5 mol %) |
| E19 | 3,3,3-trifluoropropyltrimethoxysilane (80 mol %)<br>Methacryloxypropyltrimethoxysilane (20 mol %)<br>Low viscosity variant |

Example Formulation and Curing (E20-E33)

Single component formulations were comprised of various SSQs as indicated in Table 3. Two component formulations were comprised of an SSQ mixed with a silanol-terminated polytrifluoropropylmethylsiloxane as indicated in Table 3. In formulations having two components, the components of the formulations were mixed using a roller mixer for 2 hrs until the mixtures were homogeneous. Formulations were coated onto glass slides from a pipette. Formulations were cured either thermally or via UV as indicated in Table 3. Thermally cured samples were heated in an oven at 80° C. for 20 minutes. In UV cured samples, 0.5 wt % TPO-L photoinitiator was added according to the total weight of the formulation. Ultraviolet (UV) curing of the films was performed immediately after coating using a "LIGHT HAMMER" system (Heraeus Noblelight Fusion UV Inc., Gaithersburg, Md.) using a "D-bulb" with two passes of the conveyor belt running at 30 feet per minute. After cure, clear colorless solid coatings were obtained.

TABLE 3

Examples

| Example | Compsition wt % | Cure protocol |
|---|---|---|
| E20 | 100% E1 | Thermal |
| E21 | 75% E1<br>25% PTFMS1 | Thermal |
| E22 | 75% E1<br>25% PTSMF2 | Thermal |
| E23 | 100% E2 | Thermal |
| E24 | 75% E2<br>25% PTFMS1 | Thermal |
| E25 | 75% E2<br>25% PTFMS2 | Thermal |
| E26 | 100% E3 | UV |
| E27 | 100% E4 | UV |
| E28 | 100% E5 | UV |
| E29 | 100% E8 | UV |
| E30 | 100% E9 | UV |
| E31 | 100% E12 | UV |
| E32 | 100% E13 | UV |
| E33 | 100% E16 | UV |

TABLE 4

Refractive indices

| Material (Liquid SSQ Examples) | Refractive index |
|---|---|
| E1 | 1.380 |
| E2 | 1.344 |
| E3 | 1.427 |
| E4 | 1.408 |
| E5 | 1.399 |

TABLE 4-continued

Refractive indices

| Material (Liquid SSQ Examples) | Refractive index |
| --- | --- |
| E6 | 1.391 |
| E7 | 1.385 |
| E8 | 1.371 |
| E9 | 1.362 |
| E10 | 1.353 |
| E11 | 1.350 |
| E12 | 1.365 |
| E13 | 1.357 |
| E14 | 1.336 |
| E15 | 1.335 |
| E16 | 1.361 |
| E17 | 1.339 |
| E18 | 1.335 |

TABLE 5

Viscosity data

| Material (Liquid SSQ Examples) | Viscosity (cps, room temperature) |
| --- | --- |
| E4 | 800 |
| E5 | 800 |
| E6 | 900 |
| E7 | 600 |
| E8 | 3000 |
| E9 | 5000 |
| E12 | 4000 |
| E13 | 3000 |
| E16 | 2000 |
| E19 | 270 |

TABLE 6

Static water contact angle data

| Material (Cured solid SSQ Examples) | Static water contact angle (°) |
| --- | --- |
| E20 | 95 |
| E23 | 131 |
| E26 | 92 |
| E27 | 98 |
| E28 | 97 |
| E29 | 104 |
| E30 | 112 |
| E31 | 114 |
| E32 | 123 |
| E33 | 108 |

TABLE 7

Dielectric constant data (cured solids)

| Material (Cured solid SSQ Examples) | Dielectric constant (100 kHz) | Dielectric constant (1 MHz) |
| --- | --- | --- |
| E27 | 4.98 | 4.67 |
| E29 | 3.88 | 3.58 |
| E30 | 4.02 | 3.60 |
| E31 | 3.90 | 3.58 |
| E32 | 3.75 | 3.39 |

What is claimed is:

1. A curable silsesquioxane composition comprising a three-dimensional branched network having the formula of Formula I:

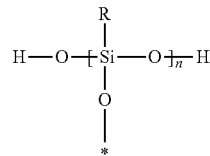

Formula I wherein:
the oxygen atom at the * is bonded to another Si atom within the three-dimensional branched network;
R is a fluorinated organic group;
n is an integer of greater than 3; and
the —OH groups are present in an amount of at least 15 wt-% of the polymer, wherein the curable composition when cured has a refractive index of 1.40 or lower, and wherein the curable composition is a coatable composition that is solvent free and wets glass.

2. The curable composition of claim 1, wherein the curable composition further comprises a silanol-terminated fluorinated polysiloxane fluid.

3. The curable composition of claim 2, wherein the silanol-terminated fluorinated polysiloxane fluid has the general formula of Formula III:

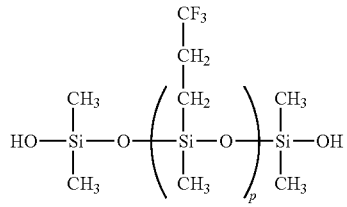

Formula III wherein:
p is an integer of 1 or greater, such that the fluid has a viscosity of from 50-250 centistokes.

4. The curable composition of claim 1, wherein R comprises a —$(CH_2)_a CF_3$, or a —$(CH_2)_b(CF_2)_c CF_3$ group;
wherein a is an integer of 1-6; b is an inter of 1-6; and c is an integer of 1-10.

5. The curable composition of claim 1, wherein the curable composition further comprises a condensation cure catalyst.

6. The curable composition of claim 1, further comprising a three-dimensional branched network having the formula of Formula II:

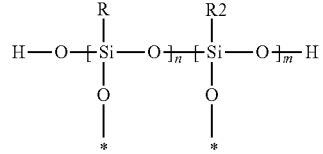

Formula II wherein:
the oxygen atom at the * is bonded to another Si atom within the three-dimensional branched network;
R is a fluorinated organic group;
R2 is an organic group comprising an ethylenically unsaturated group;

n is an integer of greater than 3 as defined above;
m is an integer of at least 1; and
the —OH groups are present in an amount of at least 15 wt-% of the polymer.

7. The curable composition of claim 6, further comprising at least one free radical initiator.

8. A curable silsesquioxane composition comprising a three-dimensional branched network having the formula of Formula II:

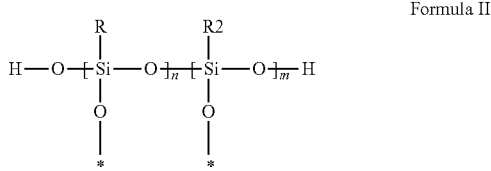

Formula II wherein:
the oxygen atom at the * is bonded to another Si atom within the three-dimensional branched network;
R is a fluorinated organic group;
R2 is an organic group comprising an ethylenically unsaturated group;
n is an integer of greater than 3;
m is an integer of at least 1; and
the —OH groups are present in an amount of at least 15 wt-% of the polymer, wherein the curable composition when cured has a refractive index of 1.40 or lower, and wherein the curable composition is a coatable composition that is solvent free and wets glass; and wherein the composition further comprises a silanol-terminated fluorinated polysiloxane fluid.

9. The curable composition of claim 8, wherein the silanol-terminated fluorinated polysiloxane fluid has the general formula of Formula III:

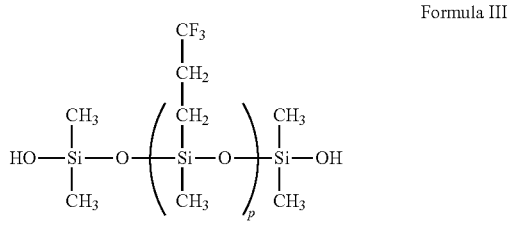

Formula III wherein:
p is an integer of 1 or greater, such that the fluid has a viscosity of from 50-250 centistokes.

10. The curable composition of claim 8, wherein R comprises a —(CH$_2$)$_a$CF$_3$, or a —(CH$_2$)$_b$(CF$_2$)$_c$CF$_3$ group; wherein a is an integer of 1-6; b is an integer of 1-6; and c is an integer of 1-10.

11. The curable composition of claim 8, wherein R2 has the formula —Y—Z, wherein Y is a bond, an alkylene group, an arylene group, or a combination thereof, and Z is an ethylenically unsaturated group selected from a vinyl group, a vinylether group, a (meth)acryloyloxy group, and a (meth)acryloylamino group.

12. The curable composition of claim 11, wherein Y is a bond, a (C1-C20)alkylene group, a (C6-C12)arylene group, a (C1-C20)alk(C6-C12)arylene group, a (C6-C12)ar(C1-C20)alkylene group, or a combination thereof.

13. The curable composition of claim 8, wherein the curable composition further comprises a condensation cure catalyst, a free radical initiator or both.

14. An article comprising:
a first substrate with a first major surface and a second major surface; and
a cured polymeric network contacting at least a portion of second major surface of the first substrate, the cured polymeric network comprising a layer of a cured curable composition comprising:
a three-dimensional branched network having the formula of Formula I:

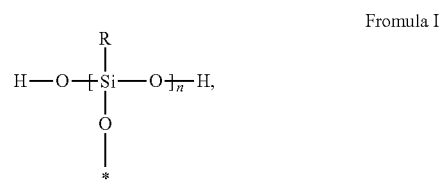

Fromula I or Formula II:

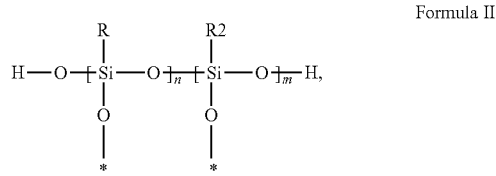

Formula II or a combination thereof,
wherein:
the oxygen atom at the * is bonded to another Si atom within the three-dimensional branched network;
R is a fluorinated organic group;
R2 is an organic group comprising an ethylenically unsaturated group;
n is an integer of greater than 3;
m is an integer of at least 1; and
the —OH groups are present in an amount of at least 15 wt-% of the polymer, wherein the curable composition when cured has a refractive index of 1.40 or lower, and wherein the curable composition is a coatable composition that is solvent free and wets glass; and wherein the composition further comprises a silanol-terminated fluorinated polysiloxane fluid.

15. The article of claim 14, wherein the layer of a cured curable composition is cured by condensation curing, by free radical polymerization, or by a combination thereof.

16. The article of claim 14, further comprising a second substrate, the second substrate having a first major surface and a second major surface, wherein the cured polymeric network is contacting at least a portion of first major surface of the second substrate.

17. The article of claim 16, wherein the first substrate and the second substrate comprises independently a film, glass, or a ceramic.

18. The article of claim 14, wherein the silanol-terminated fluorinated polysiloxane fluid has the general formula of Formula III:

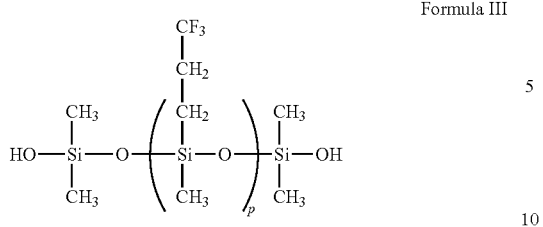

Formula III wherein:
p is an integer of 1 or greater, such that the fluid has a viscosity of from 50-250 centistokes.

19. The article of claim 14, wherein R comprises a $-(CH_2)_a CF_3$, or a $-(CH_2)_b(CF_2)_c CF_3$ group;
wherein a is an integer of 1-6; b is an integer of 1-6; and c is an integer of 1-10.

20. The article of claim 14, wherein R2 has the formula —Y—Z, wherein Y is a bond, an alkylene group, an arylene group, or a combination thereof, and Z is an ethylenically unsaturated group selected from a vinyl group, a vinylether group, a (meth)acryloyloxy group, and a (meth)acryloylamino group.

21. The article of claim 20, wherein Y is a bond, a (C1-C20)alkylene group, a (C6-C12)arylene group, a (C1-C20)alk(C6-C12)arylene group, a (C6-C12)ar(C1-C20)alkylene group, or a combination thereof.

22. The article of claim 14, wherein the curable composition further comprises a condensation cure catalyst, a free radical initiator or both.

* * * * *